(12) United States Patent
Chapman (10) Patent No.: US 6,851,112 B1
(45) Date of Patent: Feb. 1, 2005

(54) VIRTUAL MACHINE SUPPORT FOR MULTIPLE APPLICATIONS

(75) Inventor: Matthew Paul Chapman, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 09/696,776

(22) Filed: Oct. 26, 2000

(30) Foreign Application Priority Data

May 31, 2000 (GB) .............................................. 0013138

(51) Int. Cl.⁷ .............................................. G06F 9/455
(52) U.S. Cl. ...................................................... 718/1
(58) Field of Search .................................... 718/1–108

(56) References Cited

U.S. PATENT DOCUMENTS

| | | | |
|---|---|---|---|
| 6,256,637 B1 * | 7/2001 | Venkatesh et al. ...... | 707/103 Y |
| 6,356,863 B1 * | 3/2002 | Sayle .......................... | 703/27 |
| 6,453,460 B1 * | 9/2002 | Keyes ........................ | 717/108 |

FOREIGN PATENT DOCUMENTS

EP         0 962 860 A2   12/1999

OTHER PUBLICATIONS

Echidna User Guide, by Luke Gorrie, dated Jan., 1999 javagroup.org/echidna.
"Project 10xmore—SCO's Server Side Java Technology", dated Feb. 2000, sco.com/10xmore/info/index.html.
"Welcome to Project 10xmore—Highly scalable Java technology for multi–user applications", dated Feb. 2000, sco.com/10xmore/.
Technical White Paper "Enabling Java technology to efficiently support multi–user server applications", dated Feb. 2000, sco.com/10xmore/info/wp.1.html.
Project "PerkUp" Howto Pages, dated May 2000, sco.com/10xmore/info/howto.html.

* cited by examiner

*Primary Examiner*—Meng-Al T. An
*Assistant Examiner*—Kenneth Tang
(74) *Attorney, Agent, or Firm*—David A. Ming, Jr (57) ABSTRACT

A computer system runs a virtual machine which is typically capable of supporting only a single application. In order to run multiple applications on it, a single environment application is first started running on the virtual machine. Then, one or more applications are loaded into said environment application as compiled code. The loading includes scanning the compiled code for predetermined instructions, and making a modification to such predetermined instructions to call back to the environment application. This allows certain problematic instructions from the application, such as those which attempt to shut down the virtual machine, to be replaced. Each of the one or more applications is assigned to a separate thread within the environment application. This allows the one or more applications to be run by running their assigned threads within the environment application. The effect of this is that the one or more applications appear to the virtual machine as part of the environment application, in other words as if only one application in total were running on the virtual machine.

31 Claims, 6 Drawing Sheets

VIRTUAL MACHINE SUPPORT FOR MULTIPLE APPLICATIONS

BACKGROUND OF THE INVENTION

1. Field of the Invention

The invention relates to computing, and more particularly to running multiple applications in a virtual machine that typically directly supports only a single application.

2. Description of the Related Art

Programs written in the Java programming language (Java is a trademark of Sun Microsystems Inc) are generally run in a virtual machine environment, rather than directly on hardware. Thus a Java program is typically compiled into byte-code form, and then interpreted by the Java virtual machine (JVM) into hardware commands for the platform on which the JVM is executing. The JVM itself is an application running on the underlying operating system. An important advantage of this approach is that Java applications can run on a very wide range of platforms, providing of course that a JVM is available for each platform.

Java is an object-oriented language. Thus a Java program is formed from a set of classes having methods that represent sequences of instructions (somewhat akin to subroutines). A hierarchy of classes can be defined, with each class inheriting properties (including methods) from those classes (termed superclasses) which are above it in the hierarchy. At run-time objects are created as instantiations of these classes, and indeed the classes themselves are effectively loaded as objects. One Java object can call a method in another Java object. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard JVM architecture is generally designed to run only a single application, although this can be multi-threaded. In other words, a new JVM is started for each new Java application. Unfortunately however this results in an initial delay in running the application (the reasons for this will be described in more detail later). The overhead due to this starting and then stopping a JVM as each new application is run is significant. In addition each JVM has its own system memory requirement, which by default is typically some 8–16 MBytes, so that running multiple applications each on its own JVM can place significant demands on system memory.

Various attempts have been made to mitigate this problem. EP-962860-A describes a process whereby one JVM can fork into a parent and a child process, this being quicker than setting up a fresh JVM. Another approach is described in "Oracle JServer Scalability and Performance" by Jeremy Litzt, July 1999. The JServer product available from Oracle Corporation, USA, supports the concept of multiple sessions (a session effectively representing a transaction or application), each session including a JServer session. Resources such as read-only bytecode information are shared between the various sessions, but each individual session appears to its JServer client to be a dedicated conventional JVM. A parallel JVM approach is also described in "Building a Java virtual machine for server applications: the JVM on OS/390" by Dillenberger et al, IBM Systems Journal, Vol 39/1, January 2000. Here two types of JVM are utilised, a resource-owning JVM which loads and resolves necessary system classes, and subsequent 'worker' JVMs which can reuse the resolved classes.

The above systems generally require significant changes to the underlying JVM, and this can in turn lead to different problems in terms of portability and so on (they must be implemented on each JVM platform). Therefore a somewhat different approach is adopted by the Server Side Java Technology from The Santa Cruz Operation Inc (SCO). This teaches a layer between applications and the JVM that allows multiple applications to run unchanged as separate processes on a single JVM. Amongst other things this improves scalability, because there is no need to provide system memory, perform garbage collection, etc for multiple JVMs.

The details of the SCO solution are unclear from the published documentation. It is stated that the underlying JVM is unchanged, but the system does require "enhanced base classes". These are part of the Java runtime environment (JRE), which is the specific entity required to run an application (the JRE includes the JVM, Java system libraries, and certain platform libraries). Since such enhanced base classes will only be available on a limited selection of JVMs, this does not provide an Java application writer with a solution which is generally valid for all platforms.

A further development of this approach is represented by Echidna. As with the SCO Server Side Java, this is a class library which allows multiple applications to run as different threads within a single JVM, rather than having to spawn a new JVM for each application. This gives much shorter start-up times because system classes do not need to be loaded into each new JVM, rather they are available for each thread (i.e. application). Also because Echidna is written as a Java application, it is automatically portable and will work with any JVM (or JRE).

In fact, web browsers already allow multiple applets to run in parallel on a JVM within a browser. However, there are significant restrictions on the types of operation that can be performed by applets, which do not apply to the applications that can be run on Echidna.

Nevertheless, there remain some significant limitations in Echidna. These arise primarily from the fact that it is trying to provide the ability for multiple applications to run on a single JVM independently of one another, whereas as far as the JVM is aware, only a single application is running. Thus for example the applications to run on Echidna cannot have their own security manager. Accordingly, there remains a need for the ability to run multiple applications on a single JVM, but without placing undue constraints on the types of operations than can be performed by such applications.

SUMMARY OF THE INVENTION

Accordingly, the invention provides a method of running multiple applications in a computer system on a virtual machine such that the multiple applications appear to the virtual machine as only a single application, comprising the steps of:

running a single environment application on said virtual machine;

loading one or more applications as compiled code into said environment application, each of said one or more applications being assigned to a separate process within the environment application; and running said one or more applications by running their assigned processes within the environment application, whereby said one or more applications appear to the virtual machine as part of the environment application;

and wherein said step of loading includes the steps of scanning said compiled code for certain predetermined instructions, and making a modification to the compiled code of such predetermined instructions to incorporate at least one other instruction.

In the preferred embodiment the virtual machine is capable of directly supporting only a single application, and so ordinarily a new virtual machine must be started for each new application. This is avoided by running multiple applications within the environment application, since now only a single virtual machine is needed. This significantly improves start-up times, since it avoids the potentially thousands of operations which may have to be performed to load and initialise the virtual machine, and is particularly beneficial for programs which are short lived, where the start-up time, including the loading of system classes, becomes relatively very costly.

An important consideration here is that it must be transparent to the application that it is not running on its own virtual machine. Within a Java environment (the preferred setting for the present invention), this is not necessarily so unless some special modifications are made. In the prior art, it appears that the SCO solution mentioned above has been to make such modifications to the virtual machine environment, but this gives restricted utility. Alternatively the scope of the application can be significantly limited, as with Echidna. The strategy adopted by the present invention in contrast is for the environment application to (transparently) modify the operation of each application itself by making changes to its actual instructions, thereby avoiding the need to change the JRE, whilst minimising any restrictions on the application itself.

In this context it is noted that Echidna (discussed above) does scan the byte code of the applications that it runs in order to modify the class access setting. Effectively, this represents locating a standard data field in the class and changing a flag to allow wider access to the class; there is no attempt to change actual instructions (i.e. the operation) of the class itself.

In the preferred embodiment of the invention, said predetermined instructions include (i) a system exit call; and (ii) a call to create certain system user interface objects. The former is problematic since it will terminate the virtual machine and the environment application itself. Therefore the modification made is to replace the system exit call with a callback to the environment application, the callback acting to kill the process associated with the application from which the callback is received. The latter is problematic because the user interface objects are not directly owned by the relevant application, but still need to be deleted when it terminates. Therefore in this case the modification made is to incorporate a call back to the environment application with a reference to the user interface object and the process which created it. This then allows the environment application to maintain a list for each of the applications of any user interface objects associated with it. The environment application is then responsive to completion of one of the one or more applications for deleting any user interface objects associated therewith.

Also in the preferred embodiment, the environment application redirects the system output for the virtual machine to itself for processing. However, it needs to be able to distinguish output from different applications. Therefore in the scanning process, it detects instructions that write to system output. These are then modified so that they add a tag to the output to identify which of the one or more applications is responsible for the output.

Unfortunately an application may include some instructions that change a system variable of the virtual machine. This may then impact the behaviour of (or conflict with) the other applications running within the environment application. Accordingly, applications that include such instructions cannot be safely run within the environment application. Preferably therefore the scanning step detects the presence of such instructions, and if any are found, there is the possibility of launching a new virtual machine to run the application that includes such instruction. This then becomes analogous to the conventional situation, thereby maintaining overall transparency for the application.

The invention further provides a computer program product, comprising computer program instructions typically recorded onto a storage medium or transmitted over a network, for implementing the above methods.

The invention further provides a computer system for running multiple applications on a virtual machine such that the multiple applications appear to the virtual machine as only a single application, comprising:

means for running a single environment application on said virtual machine;

means for loading one or more applications as compiled code into said environment application, each of said one or more applications being assigned to a separate process within the environment application; and means for running said one or more applications by running their assigned processes within the environment application, whereby said one or more applications appear to the virtual machine as part of the environment application;

and wherein said means for loading includes means for scanning said compiled code for certain predetermined instructions, and means for making a modification to the compiled code of such predetermined instructions to incorporate at least one other instruction.

The invention further provides a computer program product comprising computer program instructions in a computer readable medium for implementation on a computer system running a virtual machine, said instructions creating an environment application running on the virtual machine which is capable of running multiple applications on the virtual machine, whereby the multiple applications appear to the virtual machine as only a single application, said environment application comprising:

means for loading one or more applications as compiled code into said environment application;

means for assigning each of said one or more applications to a separate process within the environment application; and means for launching each of said one or more applications within the process assigned thereto, such that it appears to the virtual machine as part of the environment application;

and wherein said means for loading includes means for scanning said compiled code for certain predetermined instructions, and means for making a modification to the compiled code of such predetermined instructions to incorporate at least one other instruction.

BRIEF DESCRIPTION OF THE DRAWINGS

A preferred embodiment of the invention will now be described in detail by way of example only with reference to the following drawings.

DETAILED DESCRIPTION

Figure 1:
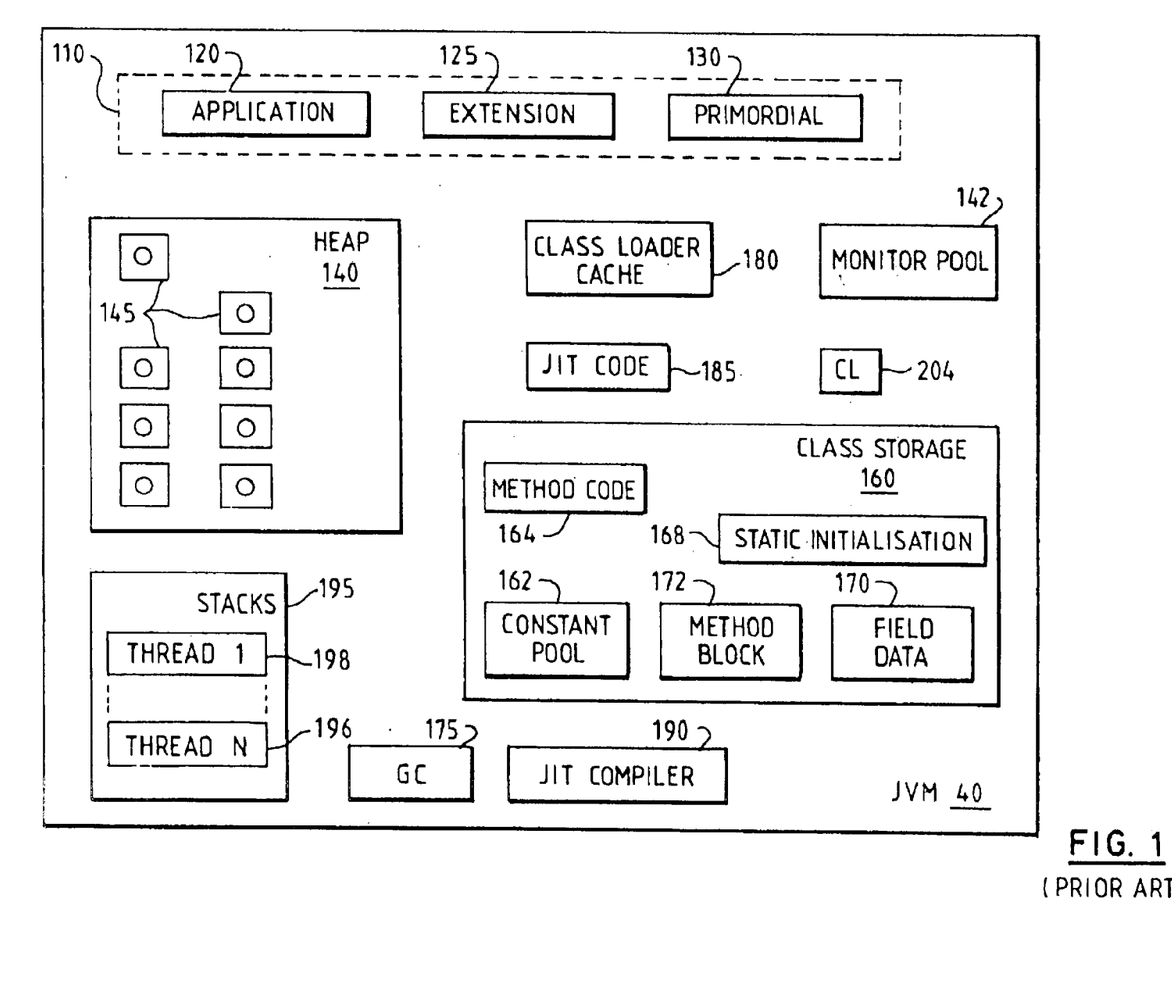
FIG. 1 illustrates some internal components of a JVM.

FIG. 1 shows the structure of a JVM 40 (omitting some components which are not directly pertinent to an understanding of the present invention). The fundamental unit of a Java program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a Java program).

For each class included within or referenced by a program, the JVM effectively walks up the class loader hierarchy, going first to the Application class loader, then the Extension class loader, and finally to the Primordial class loader, to see if any class loader has previously loaded the class. If the response from all of the class loaders is negative, then the JVM walks back down the hierarchy, with the Primordial class loader first attempting to locate the class, by searching in the locations specified in its class path definition. If this unsuccessful, the Extension class loader then makes a similar attempt. Finally, if this fails the Application class loader tries to load the class from one of the locations specified in its class path (if this fails, or if there is some other problem such as a security violation, the system returns an error). It will be appreciated that a different class path can be defined for each class loader.

The JVM further includes a component CL 204, which also represents a class loader unit, but at a lower level. In other words, this is the component that actually interacts with the operating system to perform the class loading on behalf of the different (Java) class loaders 110.

The JVM also includes a heap 140, which is shared between all threads, and is used for storage of objects 145. Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 1 may represent class objects or other object instances. (Note that strictly the class loaders as objects are also stored on heap 140, although for the sake of clarity they are shown separately in FIG. 2).

The JVM also includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag (not shown) to indicate whether or not they have been initialised.

The JVM further includes a storage area for just-in time (JIT) code 185, equivalent to method byte code which has already been compiled into machine code to be run directly on the native platform. This code is created by the JVM from Java byte code by a compilation process using JIT compiler 190, typically when the application program is started up or when some other usage criterion is met, and is used to improve run-time performance by avoiding the need for this code to be interpreted later.

Another component of the JVM is the stack area 195, which is used for storing the stacks 196, 198 associated with the execution of different threads on the JVM. Note that because the system libraries and indeed parts of the JVM itself are written in Java, and these frequently use multithreading, the JVM may be supporting multiple threads even if the user application running on top of the JVM contains only a single thread itself.

Also included within the JVM are class loader cache 180 and garbage collection (GC) unit 175. The former is effectively a table used to allow a class loader to trace those classes which it initially loaded into the JVM. The class loader cache therefore allows each class loader to check whether it has loaded a particular class—part of the operation of walking the class loader hierarchy described above. Note also that it is part of the overall security policy of the JVM that classes will typically have different levels of permission within the system based on the identity of the class loader by which they were originally loaded.

Garbage collection unit 175 is used to delete objects from heap 140 when they are no longer required. Thus in the Java programming language, applications do not need to specifically request or release memory, rather this is controlled by the JVM itself. Therefore, when Java application 50 creates an object 145, the JVM secures the requisite memory resource. Then, when the Java application finishes using object 145, the JVM can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM implementation to another, but typically GC is scheduled when the heap is nearly exhausted and so there is a need to free up space for new objects.

In general a class object will not be garbage collected by the JVM unless its class loader is deleted, and unless the class is no longer executing (i.e. no longer referenced from the stack 195 or from another location such as the class cache or another object). Note that the destruction of a class loader (or more accurately, the deletion of all references to the class loader) is in fact a relatively straightforward operation, since it is simply an instance of a class, and can always be reinstantiated. Such deletion is accompanied by the removal of all relevant entries in the class loader cache.

The destruction of a class loader is desirable in some instances, because it then allows any class files loaded by that class loader to be reloaded and reinitialised.

Finally, FIG. 1 shows a monitor pool 142, which is used for storing a set of locks (monitors) that are used to control contention to an object by different threads at times when exclusive access to the object is required.

Figure 2:
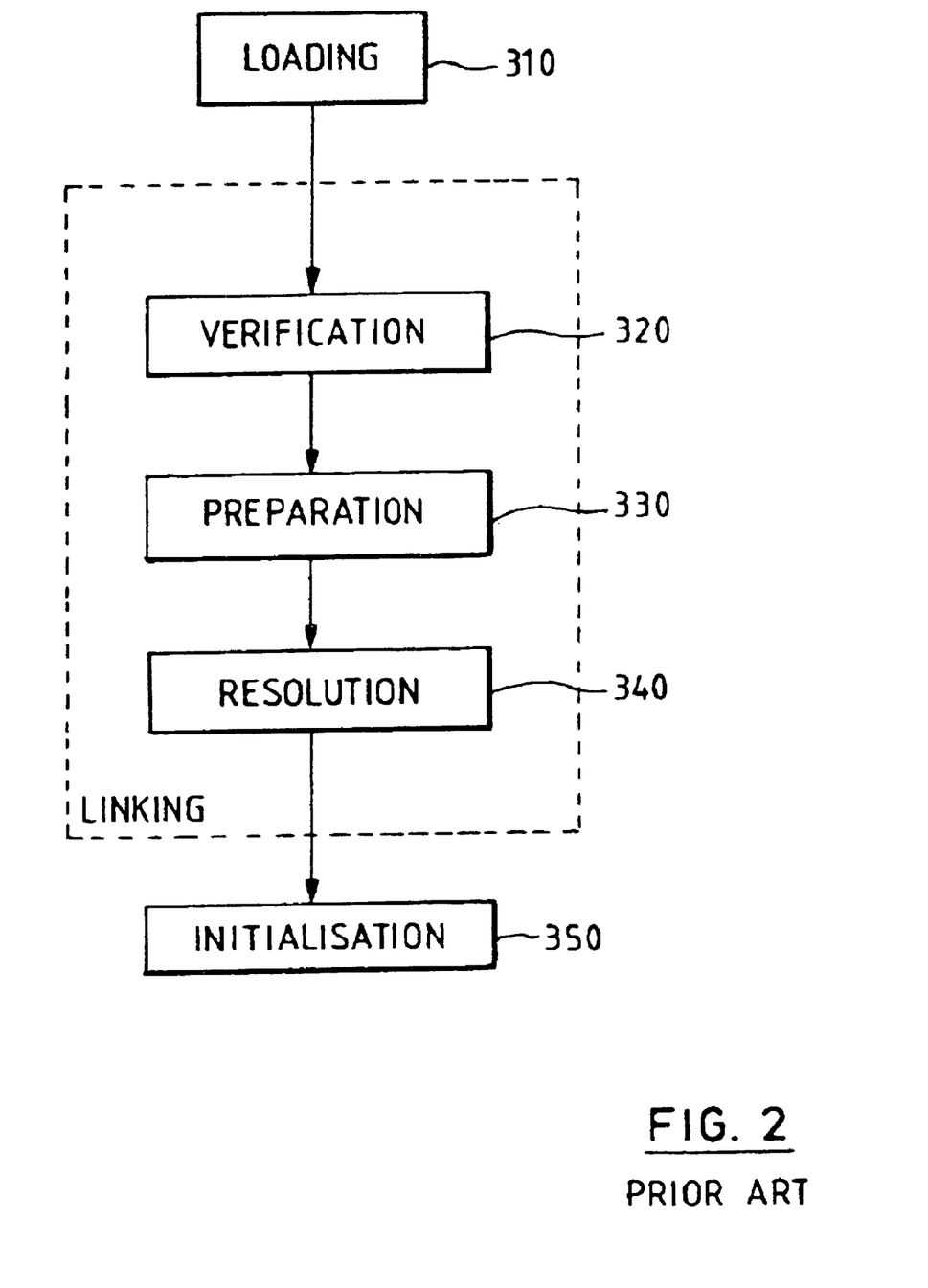
FIG. 2 is a flowchart depicting the steps required to load a class and prepare it for use.

FIG. 2 is a flowchart illustrating the operations conventionally performed to start running a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the JVM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the JVM implementation how many classes are loaded at this stage, as opposed to waiting until such classes are actually needed before loading them.

The final step in FIG. 2 is the initialisation of a loaded class (step 350), which represents calling the static initialisation method (or methods) of the class. According to the formal JVM specification, this initialisation must be performed once and only once before the first active use of a class, and includes things such as setting static (class) variables to their initial values (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class object 145 is set as part of the initialisation process, thereby ensuring that the class initialisation is not subsequently re-run.

The end result of the processing of FIG. 2 is that a class has been loaded into a consistent and predictable state, and is now available to interact with other classes. In fact, typically at start up of a Java program and its concomitant JVM, some 1000 objects are loaded prior to actual running of the Java program itself. This gives some idea of the initial delay and overhead involved in beginning a Java application.

Figure 3:
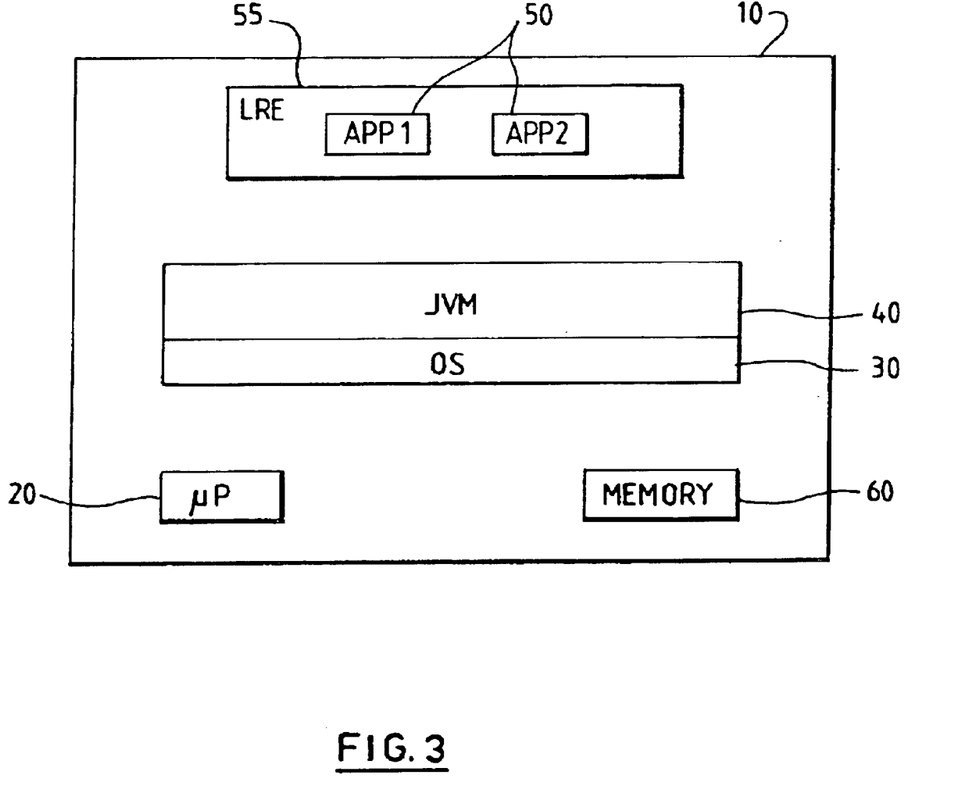
FIG. 3 shows a schematic diagram of a computer system supporting a Java Virtual Machine (JVM) and the long running environment for the JVM.

The present invention seeks to overcome this delay, and is based on the configuration illustrated in FIG. 3. Thus a computer system 10 includes a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem connection, typically via a hard disk drive (also not shown). Computer system runs an operating system (OS) 30, on top of which is provided a Java virtual machine (JVM) 40 such as described with reference to FIG. 1. The JVM looks like an application to the (native) OS 30, but in fact functions itself as a virtual operating system, supporting Java applications.

It will be appreciated that computer system 10 can be a standard personal computer or workstation, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

Also shown in FIG. 3, running on JVM 40, is the long running environment (LRE) 55. Note that to the JVM this appears just as an ordinary application. However, LRE acts as a shell in which to run multiple (standard) Java applications, App1, App2 50. These are run as separate threads within the LRE application. Only two such applications (which may themselves be multi-threaded) are shown in FIG. 3, but there may be many more. The environment is termed long-running because it continues to exist after any particular application has terminated, and so can be used to run multiple applications either in parallel and/or in series.

Thus in general terms, the LRE accepts input, such as a class file to run, similar to that passed to the "java" command, and then loads and executes that class or classes as normal, but inside the same JVM on which LRE is running. The JVM has already loaded and initialised the initial system classes when starting up for LRE, so that this overhead is not repeated for running the new application 50. As previously mentioned, this mechanism is somewhat analogous to a web browser running Java applets, but with full Java applications (including the SDK tools) instead of restricted applets. The LRE system can be implemented as a pure Java-level package and does not require any changes to JVM 40. It can therefore be packaged as a separate utility, and used with any compliant JVM.

Considering the LRE 55 now in more detail, a custom classloader is provided which subclasses the system (application) "ClassLoader" class, and then overrides the loadclass( ) method. This method locates and loads the class files required by the input to the LRE (the JVM retrieves the class from its cache if it has already been loaded). The ClassLoader.defineClass( ) method is then called to turn the array of bytes loaded into a Class. The custom classloader delegates the loading of system classes to the system (primordial) class loader, and therefore has access to any system classes already loaded by the system class loader.

The LRE needs to provide an environment for the application to run in which emulates the application running in its own JVM. This is done by the LRE creating a Java thread for each application, and this thread acting as the primordial thread for that application (which is then free to create its own threads as normal). In this way one application performing some activity won't interfere or delay the activity of another application (subject to the normal constraints of the underlying operating system).

To actually start the execution of the application, the LRE uses the Java Reflection API to find the public "main" method of the initial class, (see Sun Microsystems. Inc. Reflection Documentation, 1997. The LRE then calls Method.invoke( ) on this, with any required parameters, in the run( ) method of the thread created for the application.

Execution then proceeds in this thread, leaving the LRE free to load and begin execution of any other applications.

The LRE listens on a well known port for input, and a thin client (written in, for example, C or C++ to avoid JVM startup) can pass the relevant arguments to the LRE through a socket connected to this port. This can be extended to pass all of the required class files themselves through the socket, thereby allowing for remote execution of the class inside the same LRE.

In order to handle any input/output from an application 50, the LRE utilises the standard JVM facilities for redirecting the input and output channels. More particularly, for applications that require terminal input, this can also be captured by the thin client, or the GUI, as a character stream, and passed to the application using the System.setIn( ) method. Conversely, for output, most Java applications, particularly ones without a GUI, output text to the platform's "standard out" and "standard error" streams. This needs to be captured by the LRE, which is done using the System.setOut( ) and System.setErr( ) methods. Consequently output streams display their output to the GUI, or back to the thin client over the Socket connection, depending on the input mechanism used.

One particular concern is that each Java application (the initial class file, and all the application classes it loads) passed to the LRE must have its own namespace, so that a class or method in one application doesn't clash with one in a different application passed to the LRE. This can be achieved by creating a new instance of the custom classloader for each application, since a class is uniquely identified by the fully qualified name of a class plus the class loader instance that loaded it. This then provides a separate namespace for each application. All system classes are still loaded by the system class loader so these are still shared between all the different applications. This is achieved by the customer classloader delegating to the system classloader for system classes, as mentioned above (incidentally this is the mechanism used by the HotJava web browser to separate the namespace of different applets, and to preserve type safety between the applets and the system see Sheng Liang and Gilad Bracha, "Dynamic Class Loading in the Java™ Virtual Machine", ACM conference on OOPSLA, 1998).

An application may complete either by reaching the at end of its main( ) function or by calling the System.exit( ) method. If the application is running inside a LRE, then clearly it cannot be allowed to call System.exit( ), as this would end the LR-JVM itself, and any other applications it was running. The easiest way to prevent this is for the LRE to implement its own security manager which restricts the exit operation, but allows all others. It can then use this security manager to detect when the application attempts to exit, so that it can perform any termination and clean-up for that application itself.

However, with this approach the application being run cannot then use a security manager of its own. To avoid this limitation, the preferred embodiment utilises a different approach. In particular, bytecode manipulation is performed to change the System.exit( ) calls into a hook back into the LRE. This then tells it that the application wishes to terminate. The necessary bytecode manipulation is described in more detail below.

Having a new instance of the custom classloader for each application, as described above, also helps to keep loaded class files current, i.e. to make sure that changed class files are reloaded. In the preferred embodiment however the LRE further supports a "reload" facility, which can either be invoked explicitly, or invoked automatically upon detection of a previously loaded application. This reload causes the application to be reloaded by a new instance of the custom classloader, leaving the old instance to become a candidate for garbage collection, along with the classes which it loaded.

As system exit is prevented, as discussed above, then some way is needed to close the frames and windows opened by an application. There needs to be an association between the applications started by the LRE, and the frames and windows opened. This association does not currently exist, so this has to be formed by the LRE itself. There are three possible ways this could be done:

(a) One solution is to traverse the calling stack when a frame is opened, by parsing printStackTrace( ) from a dummy exception, but this is dependent on the format of the stack trace (i.e. is platform dependent). In addition, it only traces back to the class level, which is not necessarily the relevant application class. For example, an AWT class may be used to open a window, and provided with a callback to handle data entry in this window. The trace to this callback will indicate the AWT class, rather than the application class which made the AWT call in the first place.

(b) A second solution is to override the implementation of the java.awt.Frame class to add hooks back into the LR-JVM, so that it forms the required associations. However, this is dependent on the implementation of the Frame class which could change; moreover this would only work on Java 1, as there is no standard way to override the system classes in Java 2 without modification of the JRE itself.

(c) A third solution, which is that adopted in the preferred embodiment of the present invention, is to do bytecode manipulation again. In particular, for all of the application classes loaded, code is inserted which calls back into to the LRE immediately after a frame (or window) is created, with an identifier so the LRE can then tell which application is creating which frame.

Figure 4:
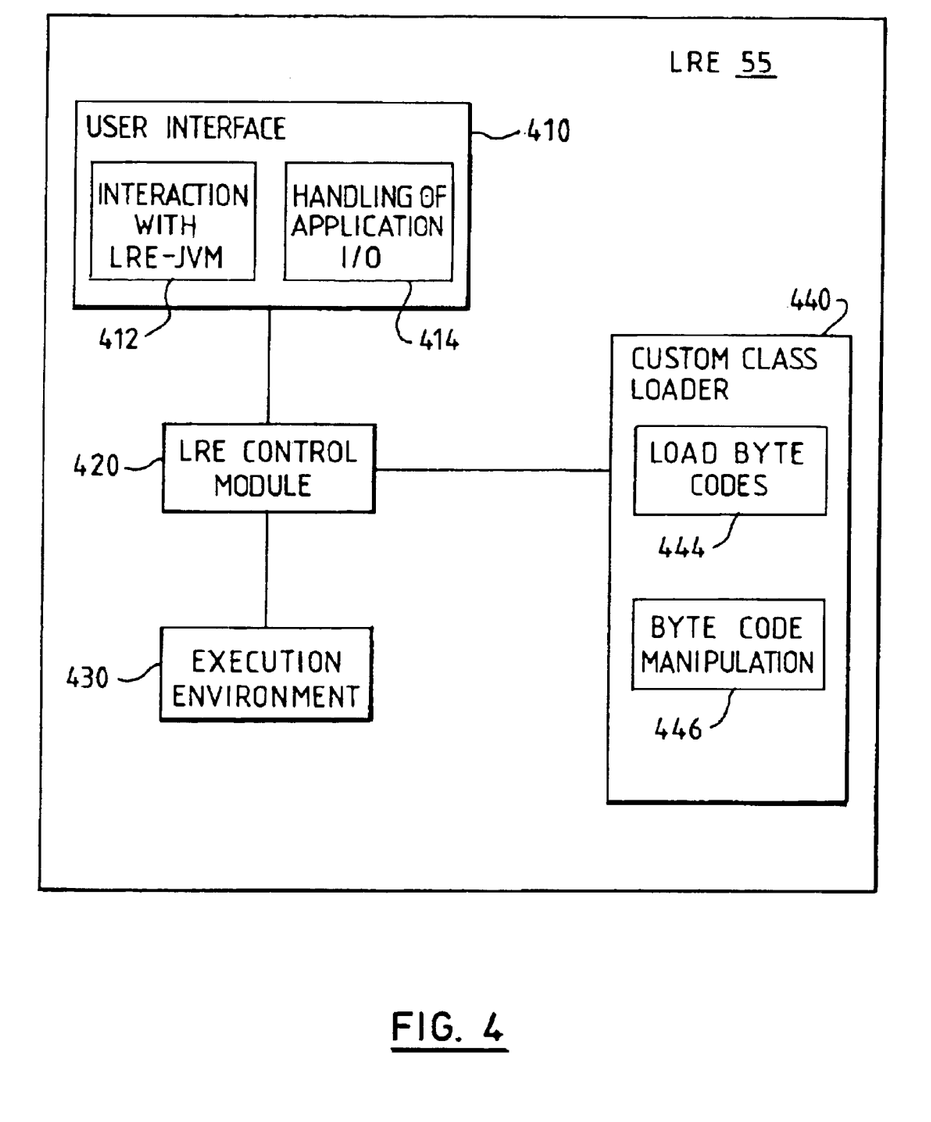
FIG. 4 is a schematic diagram showing the main components of the long running environment (LRE) for Java applications.

The structure of the LRE is shown in FIG. 4. Overall control of the LRE is performed by module 420, which is responsible for tracking applications in progress on the LRE and the resources which they are using, terminating them if required and so on. Associated with the control module is execution environment 430. This is responsible for the process described earlier of starting a new thread for each application, and then starting the relevant application within it.

The LRE also contains a user interface module 410 which has two main subcomponents, the first 412 to allow a user to interact with the LRE itself, and the second 414 to handle application input/output. The former supports the GUI front end and/or socket front end discussed above to allow a user to specify an application to the LRE, together with any other pertinent information, typically the location of the main class file, and any other class files needed or some class path in which to look for them (as previously mentioned it may also be possible to supply the class file itself over the socket interface).

This interface 412 can also be used to specify various control parameters, pertinent either to running a particular application, or to the LRE as a whole. In the former category for example might be whether to automatically reload all the application classes, or whether to allow use of existing (already loaded) application classes; and what action to take if the application contains instructions which try to modify the JVM itself (discussed in more detail below). In the latter category for example might be a limitation on the maximum number of parallel applications, or the ability to list the applications currently running in the LRE, and then select one or more for termination.

Considering now the handling of input/output for applications running on the LRE, this will typically be handled by the applications opening windows, etc using the standard Java AWT (Abstract Windowing Toolkit). These operations will not be affected by running an application as a process within the LRE, except that at termination of the application process any UI constructs will remain, since as far as the JVM is concerned their owning application (the LRE) remains current. Therefore in order to properly manage these UI resources, the preferred embodiment performs bytecode manipulation on the class file at loading (described in more detail below). This detects each application call to create a new UI object, such as a window or frame, and inserts into the code at this point a callback to the LRE to supply the identity of the application, and a reference to the UI object. This allows the LRE to properly track which applications have opened which UI resources.

An additional form of output for an application is to simply write to system output. In the preferred embodiment the LRE redirects the system output to itself, and so can receive this output from all the applications. One problem is however that it cannot readily tell from which application any particular piece of output originates. Therefore in the preferred embodiment, bytecode manipulation is performed such that any output to the standard system output is preceded by some tag that identifies the application which is producing the output. This allows the LRE to associate any material received as redirected system output with its source application. The LRE can then decide how best to process this output further; for example it might write it to a file specific to that application, or it might open a window for writing system output for that application.

Finally, the LRE also includes a custom class loader 440, which as previously mentioned is a subclass of the system class loader. This module has two main components. The first 444 is responsible for location and retrieval of each relevant class file, effectively equivalent to the loadClass method. The location may be provided directly via the user interface component 412 as previously described, or may be determined on the basis of some classpath search as is well-known in the art. Once the class file has been found, it is read into the LRE as a byte array (alternatively the class file itself may be directly supplied via user interface 412 if a socket mechanism is used, as described above, or such a loading may be performed by unit 444 via the socket interface).

The byte array is now passed to the second component 446 of the class loader, which performs bytecode manipulation. The purpose of this is to search for certain predetermined instructions in the byte code, and to take certain actions in response. There are two categories of predetermined instructions of interest:

(i) those which require modification in order for the application to run within the LRE.

(ii) those that prevent the application from running, within the LRE—these require some further action other than byte code manipulation;

Parsing a Java class file in byte code form for particular instructions is relatively straightforward due to the standard formalised definition of byte code contents in order to run on the JVM (see in particular chapter 4 of the above-referenced book by Lindholm and Yellin). The same applies to altering the byte codes to perform simple modifications, such as deleting a method, or adding a method which calls back to LRE (note that such changes will also require updating to the constant pool to delete or add the relevant method name and any other associated constants). In addition, there are also tools available to help with Java bytecode manipulation and/or decompilation. One such tool for bytecode manipulation is Jikes, which allows searching for particular instructions in a class and updating such instructions, etc. and also takes care of the necessary interaction with the constant pool. Accordingly bytecode manipulation unit 446 may optionally use some existing tool for this purpose (rib the current version of Jikes in fact requires a class name rather than a class file as input, in other words also performs the operation of unit 444 as well, but clearly this is not a key part of its functionality and could be easily modified.

There are three types of bytecode manipulation provided by the preferred embodiment of the present invention, for instructions concerning:

(i) outputting to the standard output device (ii) making a system exit call (iii) creating a UI object (frame or window)

The logical modifications required for such instruction in terms of deletions, additions or alterations to the byte code have been previously described.

Once the necessary byte code changes have been made, the custom class loader now utilises the defineClass operation method of the standard (system) class loader implementation. This then performs the operations shown in the flowchart of FIG. 2, i.e. loading the application into the JVM itself, etc.

Figure 5:
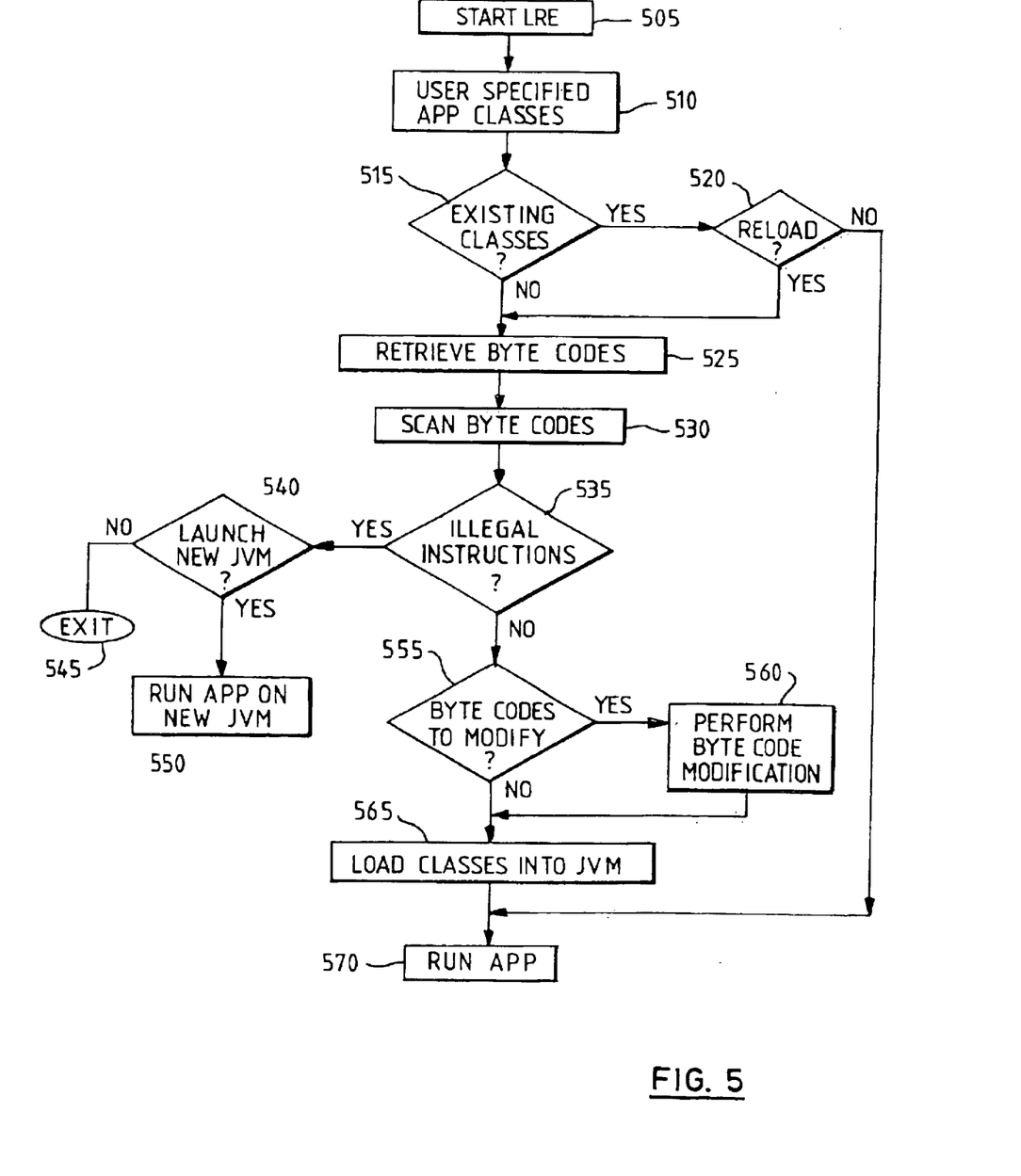
FIG. 5 is a flowchart showing the loading of ah application by the LRE.

FIG. 5 is a flowchart illustrating the way in which the LRE starts to run an application. Thus the method commences (step 505) with starting to run the LRE itself on the JVM. Next, a user specifies to the LRE an application to run (step 510) in terms of the relevant classes. The LRE then checks to see whether these have already been loaded (step 515) (the custom class loader as per a standard class loader implementation maintains a list of those classes which it has loaded); if so a decision is made whether or not to reload the classes (step 520). This decision can be based on a default system setting, on a user input parameter, on the age of the existing classes, or any other suitable parameter. If the decision is not to reload, then the method can proceed directly to running the application (step 570).

If the decision is to reload, or if the classes have not previously been loaded, then the LRE creates a new instance of the custom class loader, and proceeds to retrieve the byte codes of the relevant classes (step 525), which are then scanned for predetermined instructions (step 530). AS previously mentioned there are certain instructions which prevent the application from running within the LRE; these are checked for in step 535 (they are referred to as "illegal" here, but it will be appreciated that this means only within the context of the LRE, not in terms of Java itself). If such instructions are found, the method branches to step 540, where a decision is made whether to launch the application on a new (dedicated) JVM (step 550). This decision can be based on system defaults, the name or source of the relevant application, or the user might be specifically prompted to decide. If it is determined to launch the application on a new JVM, this can be done very easily by the LRE passing a "java" command through the JVM to the underlying platform together with the name of the application to run; otherwise the method terminates with respect to that application (step 545).

As the system scans the byte code it also checks for certain instructions that need to be modified (step 555). If any such instructions are found, the necessary modifications are performed (step 560), as described in more detail above. The classes are now ready for loading into the JVM (step 565), whereupon the application can now be run (step 570).

It will be appreciated that FIG. 5 is simplified to highlight the different logical operations, rather than specifying implementation details. For example, the tests for illegal instructions (step 535) and for instructions to be modified (step 555) are likely to be performed concurrently as the byte codes are scanned (step 530), with any necessary modifications (step 560) being performed directly as the relevant instructions are detected. In addition, once the LRE has commenced, the user can at any time specify additional applications to run, effectively jumping in at step 510 (clearly it is only in a situation where the LRE is already running or at least has already run one application that the test of step 515 might be positive).

Figure 6:
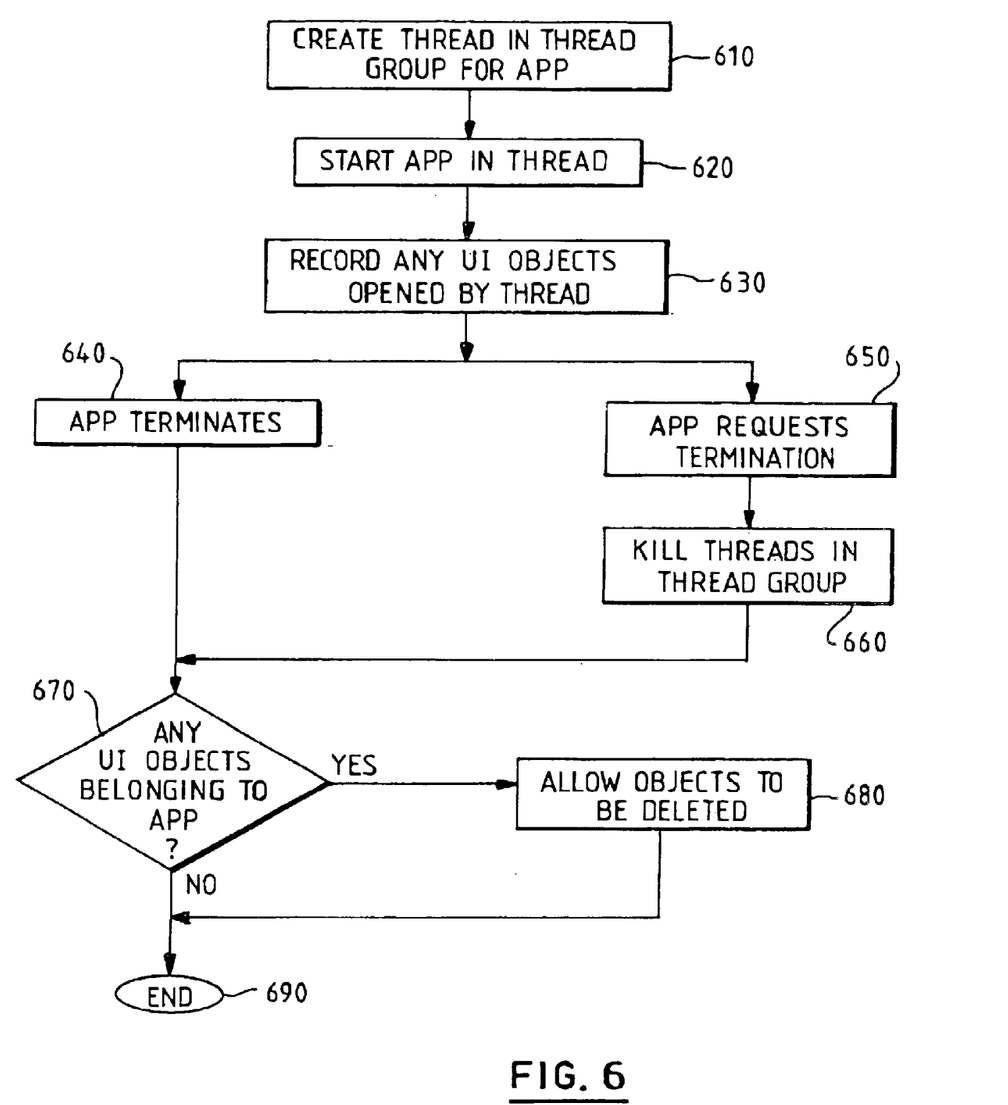
FIG. 6 is a flowchart showing the running of an application by the LRE.

Following on from FIG. 5, FIG. 6 illustrates the operations performed by the LRE in actually running an application (which it is assumed has now been loaded as per FIG. 5). Thus the LRE first creates (step 610) a thread within which the application will run, and a thread group which this thread is a member of. Consequently, any further threads which the application creates will also be in this thread group (or a subgroup of it). The application is then started within this thread (step 620). As the application runs, any UI objects that it creates are notified to the LRE by the callback inserted by the bytecode modification described above, and these are recorded by the LRE against the relevant application (step 630).

Eventually the application terminates; this can occur either because of a system exit call, or because it reaches the end of its main thread. In the former case, due to the above-mentioned bytecode modification, this results in a callback to the LRE requesting termination (step 650), which can be implemented by killing all the threads in the application thread group and any subgroups (this can be done recursively) (step 660). Alternatively, in the latter case, the application effectively terminates of its own accord (making due allowance for any subthreads) (step 640).

Once the application has been successfully terminated, the UI (AWT) resources that it created can be removed. This is achieved by reviewing the listing of UI objects belonging to that application (step 670), and deleting any so located (or more accurately releasing them for subsequent garbage collection). The application has now effectively completed on the LRE (step 690).

The LRE therefore allows multiple applications to run within a single JVM, either in parallel, and/or in series. This significantly reduces start up times, since there is no need to load and initialise any system classes, and likewise for application classes, if the same application is being run on successive occasions. In addition, where operating multiple applications in parallel, this eliminates the need for the underlying platform to have to support multiple JVMS, thereby conserving system memory and other resources.

The LRE runs as a standard Java application on any JVM, and its existence is essentially transparent to any applications that run on it. The only problem arises in respect to applications that try to change static variables in system classes, in other words that try to modify the state of the whole JVM, such as redirecting the standard system output. It is clear that such modifications will impact all the applications running on the JVM (including LRE itself). Thus it is this type of operation that is regarded as "illegal" in step 535 of FIG. 5, and will cause the LRE either to abort the application (step 545) or else to launch it on its own JVM (step 550), whichever is required.

Note however that the use of the LRE does not impact the ability to use JIT code for the application, since this is only created after the class is loaded into the JVM itself, which is after any necessary byte code modifications have been performed. In addition the application can still use native methods, since conceptually these are running on the underlying platform, and so should not impact the state of the (shared) JVM.

The LRE is particularly well-suited to situations in which certain applications, that are relatively simple (in that they do not modify static system variables), may be run many times. An example of such circumstances is a development environment, where the javac application (a java compiler) may be run repeatedly as an application is being built.

It will be appreciated that the skilled person will be aware of many variations on the implementation described above. For example, the bytecode manipulation could actually be performed by firstly decompiling the entire byte array, then processing the source code, and then recompiling. In addition, the preferred embodiment has been described in relation to Java, but could also be extended to similar virtual machine environments. Many other modifications will be apparent to the skilled person.

What is claimed:

1. A method of running multiple applications in a computer system on a virtual machine such that the multiple applications appear to the virtual machine as only a single application, comprising the steps of:

running a single environment application on said virtual machine:

loading one or more applications as compiled code into said environment application, each of said one or more applications being assigned to a separate process within the environment application; and running said one or more applications by running their assigned processes within the environment application, whereby said one or more applications appear to the virtual machine as part of the environment application; and wherein said step of loading includes the steps of scanning said compiled code for certain predetermined instructions and performing first bytecode manipulation to effect a callback to said environment application for a system exit call, wherein the first bytecode manipulation is to replace the system exit call with a callback to the environment application, and performing a second bytecode manipulation to effect a callback to said environment for creation of a frame or window.

2. The method of claim 1, wherein said virtual machine is capable of directly supporting only a single application.

3. The method of claim 2, wherein said predetermined instructions include a call to create certain system user interface objects.

4. The method of claim 3, wherein the second bytecode manipulation is to incorporate a call back to the environment application with a reference to the user interface object and the process which created it.

5. The method of claim 4, wherein the environment application maintains a list for each of said one or more applications of any user interface objects associated with it, the environment application being responsive to completion of one of the one or more applications for deleting any user interface objects associated therewith.

6. The method of claim 2, further comprising the step of redirecting system output for the virtual machine to the environment application.

7. The method of claim 6, wherein said predetermined instructions include writing to system output, and said modification comprises adding a tag to the output to identify which of the one or more applications is responsible for the output.

8. The method of claim 2, wherein the step of scanning said compiled code for certain predetermined instructions includes scanning for instructions that change a system variable of the virtual machine.

9. The method of claim 8, further comprising the step, responsive to detecting an instruction that changes a system variable, of launching a new virtual machine to run the application that includes such instruction.

10. The method of claim 1, wherein said callback acting to kill the process associated with the application from which the callback is received.

11. A computer system for running multiple applications on a virtual machine such that the multiple applications appear to the virtual machine as only a single application, comprising:
  means for running a single environment application on said virtual machine;
  means for loading one or more applications as compiled code into said environment application, each of said one or more applications being assigned to a separate process within the environment application; and
  means for running said one or more applications by running their assigned processes within the environment application, whereby said one or more applications appear to the virtual machine as part of the environment application; and
  wherein said means for loading includes means for scanning said compiled code for certain predetermined instructions and performing a first bytecode manipulation to effect a callback to said environment application for a system exit call, wherein the first bytecode manipulation is to replace the system exit call with a callback to the environment application, and means for performing a second bytecode manipulation to effect a callback to said environment for creation of a frame or window.

12. The system of claim 11, wherein said virtual machine is capable of directly supporting only a single application.

13. The system of claim 12, wherein said predetermined instructions include a call to create certain system user interface objects.

14. The system of claim 13, wherein the second bytecode manipulation is to incorporate a call back to the environment application with a reference to the user interface object and the process which created it.

15. The system of claim 14, wherein the environment application maintains a list for each of said one or more applications of any user interface objects associated with it, the environment application being responsive to completion of one of the one or more applications for deleting any user interface objects associated therewith.

16. The system of claim 12, further comprising means for redirecting system output for the virtual machine to the environment application.

17. The system of claim 16, wherein said predetermined instructions include writing to system output, and said modification comprises adding a tag to the output to identify which of the one or more applications is responsible for the output.

18. The system of claim 12, wherein the means for scanning said compiled code for certain predetermined instructions includes means for scanning for instructions that change a system variable of the virtual machine.

19. The system of claim 18, further comprising means, responsive to detecting an instruction that changes a system variable, for launching a new virtual machine to run the application that includes such instruction.

20. The system of claim 11, wherein said callback acting to kill the process associated with the application from which the callback is received.

21. A computer program product comprising computer program instructions in a computer readable medium for implementation on a computer system running a virtual machine, said instructions creating an environment application running on the virtual machine which is capable of running multiple applications on the virtual machine, whereby the multiple applications appear to the virtual machine as only a single application, said environment application comprising:
  means for loading one or more applications as compiled code into said environment application;
  means for assigning each of said one or more applications to a separate process within the environment application; and
  means for launching each of said one or more applications within the process assigned thereto, such that it appears to the virtual machine as part of the environment application; and
  wherein said means for loading includes means for scanning said compiled code for certain predetermined instructions and performing a first bytecode manipulation to effect a callback to said environment application for a system call, wherein the first bytecode manipulation is to replace the system exit call with a callback to the environment application, and means for performing a second bytecode manipulation to effect a callback to said environment for creation of a frame or window.

22. The program product of claim 21, wherein said virtual machine is capable of directly supporting only a single application.

23. The program product of claim 22, wherein said predetermined instructions include a call to create certain system user interface objects.

24. The program product of claim 23, wherein the second bytecode manipulation is to incorporate a call back to the environment application with a reference to the user interface object and the process which created it.

25. The program product of claim 24, wherein the environment application maintains a list for each of said one or more applications of any user interface objects associated with it, the environment application being responsive to completion of one of the one or more applications for deleting any user interface objects associated therewith.

26. The program product of claim 22, wherein the environment application further comprising means for redirecting system output for the virtual machine to the environment application.

27. The program product of claim 26, wherein said predetermined instructions include writing to system output, and said modification comprises adding a tag to the output to identify which of the one or more applications is responsible for the output.

28. The program product of claim 22, wherein the means for scanning said compiled code for certain predetermined instructions includes means for scanning for instructions that change a system variable of the virtual machine.

29. The program product of claim 28, further comprising means responsive to detecting an instruction that changes a system variable, for launching a new virtual machine to run the application that includes such instruction.

30. The program product of claim 29, wherein said means for loading comprises a class loader which is a subclass of a system class loader included in the virtual machine.

31. The program product of claim 21, wherein said callback acting to kill the process associated with the application from which the callback is received.

* * * * *

UNITED STATES PATENT AND TRADEMARK OFFICE
CERTIFICATE OF CORRECTION

PATENT NO. : 6,851,112 B1
DATED : February 1, 2005
INVENTOR(S) : Chapman

It is certified that error appears in the above-identified patent and that said Letters Patent is hereby corrected as shown below:

Title page,
Item [74], *Attorney, Agent or Firm*, please delete "Ming" and replace with -- Mims --.

Signed and Sealed this

Seventeenth Day of May, 2005

JON W. DUDAS
*Director of the United States Patent and Trademark Office*